United States Patent Office 3,767,677
Patented Oct. 23, 1973

3,767,677
PROCESS FOR THE PREPARATION OF
6,6-ALKYLENEDIOXYHEPTAN-2-ONE
Pius Anton Wehrli, North Caldwell, N.J., assignor to
Hoffmann-La Roche Inc., Nutley, N.J.
No Drawing. Filed July 8, 1970, Ser. No. 53,281
Int. Cl. C07d 13/04
U.S. Cl. 260—340.9
3 Claims

ABSTRACT OF THE DISCLOSURE

A two-step process for the preparation of 6,6-alkylenedioxyheptan-2-one starting from diketene and formaldehyde is described. In the first step diketene and formaldehyde are reacted to form 2,6-heptanedione. Selective ketalization of the latter compound results in the formation of 6,6-alkylenedioxyheptan-2-one as major product. Recycle of by-product diketal obtained in this step is also described. The final product is useful as an intermediate in the total synthesis of medicinally valuable steroids.

BACKGROUND OF THE INVENTION

Processes for the total synthesis of medicinally valuable steroids are described in U.S. patent application Ser. No. 765,023, filed Oct. 4, 1968 and in U.S. patent application Ser. No. 845,546, filed July 28, 1969, inventor Zoltan G. Hajos, now U.S. Pat. No. 3,692,803. One of the important elements in the economic viability of total synthesis processes is the availability of starting materials which are readily available in the commercial market and which are relatively inexpensive. An important intermediate in the aforesaid total synthesis process scheme is 7,7-alkylenedioxy-3-oxo-octanoic acid ethyl ester. Since this compound is readily available from 6,6-alkylenedioxyheptan-2-one by treatment of the latter compound with diethyl carbonate in the presence of base, e.g., an alkali metal hydride such as sodium hydride, it is of great importance to the economics of the aforesaid total synthesis scheme that 6,6-alkylenedioxyheptan-2-one be prepared from inexpensive, readily obtainable raw materials.

BRIEF DESCRIPTION OF THE INVENTION

The present invention relates to a process for the preparation of 6,6-alkylenedioxyheptan-2-one starting with readily available, comparatively inexpensive raw materials. In particular, the present invention relates to the preparation of the aforesaid ketal-ketone compounds in a two step procedure starting with diketene and formaldehyde.

In the first process step of the present invention diketene is reacted with formaldehyde in an aqueous reaction medium to yield 2,6-heptanedione. This reaction is conveniently conducted at a temperature in the range of from about 0° to 100° C., most preferably in the range of from about 20° to 60° C., e.g. 30° to 50° C. Stoichiometric amounts of diketene per mole of formaldehyde is employed, i.e. 2 moles of diketene per mole of formaldehyde. A reaction period of from about 4 to 48 hours, most preferably 20 to 30 hours is utilized although the period is not broadly critical and is related to the temperature. The product diketone is readily isolated from the reaction medium by solvent extraction followed by distillation.

The second process step of the present invention involves the selective ketalization of 2,6-heptanedione so as to yield the desired 6,6-alkylenedioxyheptan-2-one. This ketalization is conveniently carried out by reacting the diketone with a ketalizing agent such as an alkylene glycol, e.g. ethylene glycol, 1,2-propylenediol, 2,3-butylenediol and the like in a suitable inert organic solvent which preferably is immiscible with the ketalizing agent. Inert organic solvents useful in the ketalization step include hydrocarbons, most particularly, aromatic hydrocarbons such as benzene, xylene, and toluene or aliphatic hydrocarbons having 5–10 carbon atoms such as hexane, heptane and the like. Toluene represents a most preferred inert organic solvent. The reaction medium will also contain a strong inorganic acid, most preferably a mineral acid such as concentrated sulfuric acid, anhydrous hydrochloric acid and the like or a Lewis acid such as boron trifluoride.

The ketalization reaction is generally conducted at a temperature in the range of from about −30° to +30° C., most preferably at about 0° C. The ketalizing agent will be present in the reaction mixture in a molar excess, e.g. in the range of from about 1 to 10 moles per mole of diketone, most preferably in the range of from about 3 to 6 moles per mole of diketone. It is most surprising that in view of the large excess of ketalizing agent present and the presence of two functional ketone groups on the starting material that the product obtained is observed to consist of a major amount of the desired mono ketal and only a minor amount of diketal.

A further aspect of the present invention relates to the separation of the mono ketal from the diketal in the reaction product from the above process. This separation can be conveniently carried out by utilizing a sodium bisulfite extraction step which is conducted in an organic solvent solution of the above residue. Suitable organic solvents for this purpose include ethers such as diethyl ether, or tetrahydrofurane esters such as ethyl acetate and the like.

Extraction of the organic solvent containing the mixture of mono and diketal with aqueous sodium bisulfite solution results in selective removal of the mono ketal into the sodium bisulfite aqueous layer whereas the diketal is essentially retained in the organic layer. The diketal can be recovered from the organic layer by concentration of the solvent. This material can be recycled after hydrolysis, e.g., by treatment with dilute aqueous mineral acids, such as hydrochloric acid and an inert organic solvent such as an aromatic hydrocarbon, most preferably toluene. The hydrolysis is preferably conducted at elevated temperatures, most preferably at about the reflux temperature of the reaction medium. The hydrolysis product consists of a mixture of small amounts of 2,6-heptanedione and the diketal and a major amount of the desired product mono ketal. Thus, it can conveniently be recycled to the sodium bisulfite extraction step rather than to the ketalization step which would have been necessary had the hydrolysis involved complete removal of both ketal groups from the diketal compound.

The aqueous sodium bisulfite layers from the extraction step contain the desired 6,6-alkylenedioxyheptan-2-one product. The product is removed from the sodium bisulfite solution by adding the sodium bisulfite solution to a stirred slurry of sodium bicarbonate in a suitable inert organic solvent, e.g., a hydrocarbon, most preferably an aromatic hydrocarbon such as toluene. After neutralization to a pH of 7.5 in the aqueous layer the desired product is extracted out into the organic solvent by repeated extractions. Removal of the solvent by concentration in the manner known per se yields the desired mono ketal product in high purity.

The product 6,6-alkylenedioxyheptan-2-one can be converted into 7,7-alkylenedioxy-2-oxo-octanoic acid ethyl ester by treating the former compound with diethyl carbonate in the presence of base, e.g., an alkali metal hydride such as sodium hydride. As indicated previously, 7,7-alkylenedioxy-2-oxo-octanoic acid ethyl ester is an intermediate useful in the total synthesis of steroids. It should be noted, however, that this conversion step is not considered to be part of the present invention but is mentioned here merely in the interest of providing a more complete description of the utility of the present invention.

The term "alkylene" as used herein is meant to include hydrocarbon radicals having from 2 to 4 carbon atoms such as for example ethylene, propylene and butylene. A most preferred alkylene radical for the purpose of this invention is ethylene.

EXAMPLE 1

Into the reaction vessel were placed in the following sequence: 1,000 ml. of water, 204 g. (2.5 moles) of formaldehyde solution (37%) and 420 g. (5.0 moles) of diketene. Under good stirring the heterogeneous mixture is warmed to 40° C. Carbon dioxide is evolved. The exothermic reaction is controlled in such a way, that the temperature is maintained at 40° C. for 24 hours. For the first 6–8 hours water cooling is necessary. After this period slight warming is required. The reaction mixture is then cooled to room temperature and saturated with approximately 350 g. of NaCl. The precipitated oil is extracted three times with 250 ml., a total of 750 ml., of benzene. The combined benzene phases were washed once with 100 ml. of saturated $NaHCO_3$ solution and once with 100 ml. of saturated NaCl solution before removal of solvent on a rotary evaporator at 40° C. bath temperature. The residue, 196.4 g., was distilled over a 10 cm. Vigreux column at the water pump vacuum. The main fraction (40% yield) is 2,6-heptanedione as a colorless oil crystallizing upon standing. M.P. 32–34° C.

EXAMPLE 2

Into a 1-liter round bottom flask were placed 100 g. (0.795 mole) of 2,6-heptanedione, 200 g. (3.23 mole) of ethyleneglycol and 500 cc. of toluene. The heterogeneous mixture was stirred for 20 minutes in an ice bath prior to adding 36 g. (20 cc., 0.367 mole) of concentrated $H_2SO_4$ via a pipette. Vigorous stirring was maintained at ice bath temperature for 35 minutes. After this time the murky mixture was transferred to a 1 l. separatory funnel, the colorless lower ethylene glycol layer was separated and washed twice in two additional 500 cc. separatory funnels, each time with 100 cc., a total of 200 cc., of toluene. To the original toluene layer was added at once a slurry of 10 g. of $NaHCO_3$ in 50 cc. of water with vigorous stirring. After shaking and separating the sodium bicarbonate phase was used to wash the toluene extracts in the second and third separatory funnels. The three toluene extracts were washed with two 50 cc. portions, a total of 100 cc., of saturated NaCl solution. The combined organic layers were evaporated at water pump vacuum on the rotary evaporator. A crude reaction product weighing ca. 145 g. was obtained as a colorless oil. VPC-analysis of this crude residue indicated a mixture of 11 percent of starting material, 61 percent of 6,6-ethylenedioxyheptan-2-one and 28 percent of 2,2,6,6-diethylenedioxyheptane.

The above crude residue ca. 145 g. was transferred to a 3-necked 1-liter flask with a bottom outlet using a total of 250 cc. of ether for complete transfer. The ethereal solution was extracted three or four times with 200 cc.-portions, a total of 600–800 cc., of 20 percent (w./v.) sodium bisulfite solution, stirring the 2-phase system vigorously each time for 15 min. The ether phase was washed once with 50 cc. of saturated NaCl, prior to removal of the solvent at the rotary evaporator. The residue was a colorless oil which consisted mainly of 2,2,6,6-diethylenedioxyheptane.

As soon as the above sodium bisulfite layers were separated, they were transferred to a dropping funnel and added slowly to a stirred slurry of 150 g. of sodium bicarbonate in 250 cc. of toluene. Considerable foaming occurred. After all extracts were added, the pH of the water layer was adjusted to 7.5 (glass electrode) by the addition of ca. 20–50 g. of $Na_2CO_3.H_2O$. The mixture was stirred for 30 min. and then transferred to a 2 l. separatory funnel. The water layer was separated and washed with two 100 cc.-portions, a total of 200 cc., of toluene. The toluene layers were washed with two 50 cc.-portions, a total of 100 cc., of saturated NaCl solution. The three toluene layers were combined and the solvent removed at water pump vacuum. For complete removal of the solvent, the residue was heated in an oil bath (100 C.). Using a Claisen head, the last traces of toluene were removed at 14 mm. until the residue reached a constant weight. A total of 63.9 g. (47 percent) of a colorless oil was obtained which by VPC (neat injection) was found to contain 95 percent of 6,6-ethylenedioxyheptan-2-one.

EXAMPLE 3

The isolated diketal residue from Example 2 (47.2 g.) was dissolved in 100 cc. of toluene and 2.5 cc. of 0.1 N HCl was added. After refluxing for 15 min. and immediate cooling in an ice bath, 3 cc. of saturated $NaHCO_3$ solution was added, followed by 25 cc. of saturated NaCl. The layers were separated and the organic phase was evaporated in vacuo. The residue weighed 40.8 g. and consisted (VPC) of a mixture of 2,6-dioxoheptane; 6,6-ethylenedioxyheptan-2-one (50–55 percent) and 2,2,6,6-diethylenedioxyheptane. This mixture is recycled by addition to the sodium bisulfite extraction step of Example 2.

What is claimed is:

1. A process for the preparation of 6,6-($C_2$–$C_4$) alkylenedioxyheptan-2-one which process comprises in combination:

(A) reacting 2,6-heptanedione with a molar excess of a $C_2$–$C_4$ alkyleneglycol at a temperature in the range of from about —30° to +30° C. in a reaction medium containing a strong inorganic acid and an inert organic solvent so as to selectively form 6,6-($C_3$–$C_4$) alkylenedioxy heptan-2-one; and (B) removing product 6,6-($C_2$–$C_4$) alkylenedioxy heptan-2-one from the reaction medium by extraction with sodium bisulfite solution.

2. The process of claim 1 wherein said alkylene group is ethylene.

3. The process of claim 1 wherein said sodium bisulfite extract is neutralized with sodium bicarbonate; extracted with an inert organic solvent; and said inert organic solvent, after separation from said sodium bisulfite extract, is removed.

References Cited
UNITED STATES PATENTS 3,562,313   2/1971   Cross et al. _____ 260—340.9

ALEX MAZEL, Primary Examiner

J. H. TURNIPSEED, Assistant Examiner

U.S. Cl. X.R.

260—338, 340.7, 593 R

UNITED STATES PATENT AND TRADEMARK OFFICE
CERTIFICATE OF CORRECTION

PATENT NO. : 3,767,677
DATED : 10/23/73
INVENTOR(S) : Pius Anton Wehrli

It is certified that error appears in the above-identified patent and that said Letters Patent are hereby corrected as shown below:

Col. 4, line 46, "$(C_3-C_4)$" should be: $(C_2-C_4)$

Signed and Sealed this fifteenth Day of June 1976

[SEAL]

Attest:

RUTH C. MASON
*Attesting Officer*

C. MARSHALL DANN
*Commissioner of Patents and Trademarks*